No. 875,948. PATENTED JAN. 7, 1908.
F. L. RACOUILLAT & T. P. REID.
MEASURING DEVICE.
APPLICATION FILED APR. 10, 1906.

WITNESSES:

INVENTORS
Ferdinand Lucen Racouillat
Thomas Prestley Reid
BY
ATTORNEYS

UNITED STATES PATENT OFFICE.

FERDINAND LUCEN RACOUILLAT AND THOMAS PRESTLEY REID, OF SAN FRANCISCO, CALIFORNIA, ASSIGNORS OF ONE-SIXTH TO FRANK SHULA, OF SAN FRANCISCO, CALIFORNIA.

MEASURING DEVICE.

No. 875,948.     Specification of Letters Patent.     Patented Jan. 7, 1908.

Application filed April 10, 1906. Serial No. 310,912.

*To all whom it may concern:*

Be it known that we, FERDINAND LUCEN RACOUILLAT and THOMAS PRESTLEY REID, citizens of the United States, and residents of San Francisco, in the county of San Francisco and State of California, have invented a new and Improved Measuring Device, of which the following is a full, clear, and exact description.

The purpose of the invention is to provide a measuring device particularly adapted for dispensing predetermined quantities of pulverized or granulated material, and to so construct the device that it will be compact, simple, durable and economic, and so that it can be conveniently operated.

Another purpose of the invention is to provide a device of the character described, which during the operation of dispensing the material will automatically cause an agitation of the contents of the receptacle, thus reducing any lumps that may occur and insuring a proper feed of material to the measuring chamber, and also to so construct the device that when not in use its contents will be effectually prevented from spilling.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1:
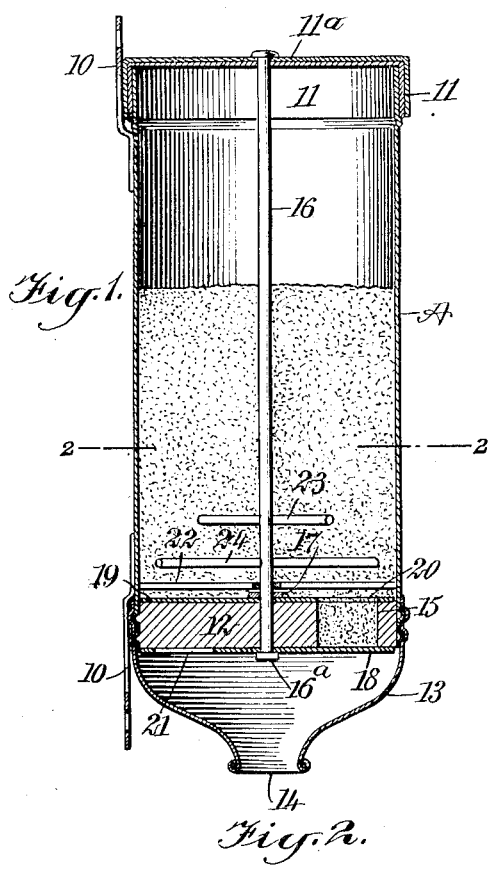
Figure 2:
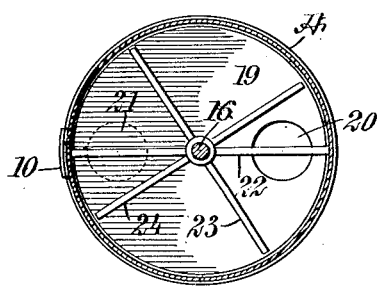

Figure 1 is a longitudinal vertical section through the device; and Fig. 2 is a horizontal section taken practically on the line 2—2 of Fig. 1.

A represents a receptacle which may be of any desired size or of any suitable shape. Usually, however, the receptacle A is made circular in cross section, as shown, and may be provided at top and bottom with externally-applied lugs 10, whereby to secure the receptacle to an upright support. The receptacle A is provided with a tight inner cover 11, and an outer cover 11$^a$, revolubly mounted upon the inner cover. The bottom 12, of wood, metal or other suitable material, is preferably screwed into the bottom portion of the receptacle A, and at the exterior of the bottom portion of the body of the receptacle a chute 13 is screwed or otherwise applied. The said chute tapers down to an outlet 14 at its lower portion, the said outlet 14 under the form of chute shown in Fig. 1 being at the central bottom portion of the chute. But in the form of chute shown in Fig. 3 the said outlet 14 is at the lower front portion thereof.

The bottom 12 for the receptacle A is provided at one side of its center with a chamber 15, extending through the upper and the lower faces of the said bottom 12, which chamber 15 is a measuring chamber, being adapted to be filled by the contents of the receptacle A, and to discharge said measured material at proper time. A spindle or shaft 16 is mounted to turn loosely in the central portion of the bottom 12, the said shaft being provided with a head 16$^a$ at its bottom portion and with a collar 17 just above the said bottom, as is shown in Figs. 1 and 3. A disk 18 is secured to the said shaft or spindle 16, and as the shaft is turned the said disk is adapted to move in engagement with the under face of the bottom 12 of the receptacle. A second disk 19 is likewise secured to the shaft or spindle 16, which latter disk 19, as said spindle or shaft is turned, moves in engagement with the upper face of the said bottom 12, as is shown in Figs. 1 and 3. These disks 18 and 19 extend as near as possible to the inner face of the receptacle A and yet turn freely in said receptacle.

The lower disk 18 is provided with an aperture 21 at one side of its center, and the upper disk 19 is provided with a corresponding aperture 20, but the two apertures 20 and 21 in the two disks are diametrically opposite, and each of said apertures 20 and 21 is adapted at one period in the rotation of the disk in which the aperture is located, to be in full registry with the measuring chamber 15 in the bottom 12. When, however, the aperture 20 in the upper disk 19 is in registry with the measuring chamber 15, the material in the receptacle may be passed into and fill the said measuring chamber, as the bottom portion of the measuring chamber will be closed by the solid portion of the lower disk 18, as is shown in Fig. 1. After the measuring chamber 15 has been filled, by further turning the shaft or spindle 16 the solid portion of the upper disk 19 is made to cover the top of the measuring chamber 15, and the aperture 21 in the lower disk 18 is brought into registry with the measuring chamber 15, as is shown in Fig. 3, thus permitting the escape of the material from the said measuring chamber 15 into the chute 13, from which the material thus measured passes out through the outlet opening 14.

A bar 22 extends from side to side of the receptacle A, just above the central portion of the upper disk 19 and also over the central portion of the measuring chamber 15, and the ends of the bar 22 are secured to the receptacle A in any suitable or approved manner. The said bar 22 is usually provided with a central eye through which the spindle or shaft 16 is loosely passed. The said spindle or shaft 16 is provided with agitating arms 23 and 24, located one above the other and usually at right angles to each other, which agitating arms or bars 23 and 24 are horizontally placed and extend beyond opposite sides of the said spindle or shaft 16, and the ends of the said agitating arms or bars 23 and 24 approach the inner sides of the receptacle A more or less closely. The fixed bar 22 may be termed a spreading bar since it tends to level and render compact the material at the upper face of the upper disk 19 as said disk is revolved, while the agitating arms 23 and 24 serve to break up any lumps or large particles that may be formed in the material in the receptacle, and likewise insures a reliable feed of the material to the upper disk 20. The upper end of the shaft or spindle 16 is loosely passed through the center of the inner cover 11, and is secured to the central portion of the outer cover or cap 11ª, so that by turning the cap or cover 11ª the spindle 16 is likewise turned to open or close the measuring chamber 15.

Having thus described our invention, we claim as new, and desire to secure by Letters Patent,—

In a measuring device, the combination with a body, a chute at the lower end of the body, a stationary inner cover for the body, an outer cap cover mounted to turn upon the body, and a fixed bottom located above the chute and provided with a measuring chamber near the edge extending through from its upper to its lower face, of a shaft mounted to turn in said bottom and in said body, being secured at its upper end to the rotatable cover, disks secured to the shaft located one above and the other below said bottom, each disk having an aperture therein, but at diametrically opposite points, which apertures as the shaft revolves alternately register with the chamber in said bottom whereby the chamber is alternately charged with material and the material discharged therefrom, a spreader bar fixed in the body above the upper disk which centrally crosses the measuring chamber in the bottom and extends from side to side of the body, which bar insures the spreading and leveling of the material in the body lying smoothly upon the upper disk as it revolves, and a series of agitating and crushing arms secured to the shaft above the said bar, one series of arms extending over the spaces between the arms of the other series.

In testimony whereof we have signed our names to this specification in the presence of two subscribing witnesses.

FERDINAND LUCEN RACOUILLAT.
THOMAS PRESTLEY REID.

Witnesses:
GEO. W. WRIGHT,
LINCOLN SONNTAG.